March 26, 1940.　　　C. A. HALL　　　2,195,211

SECONDARY OR STORAGE BATTERY

Filed Sept. 22, 1937

Glass Wool Fabric

WITNESS:

INVENTOR
Clarence A. Hall
BY
Augustus B. Stoughton
ATTORNEY.

Patented Mar. 26, 1940

2,195,211

UNITED STATES PATENT OFFICE 2,195,211

SECONDARY OR STORAGE BATTERY

Clarence A. Hall, Philadelphia, Pa., assignor to The Electric Storage Battery Company, Philadelphia, Pa., a corporation of New Jersey Application September 22, 1937, Serial No. 165,031

5 Claims. (Cl. 136—55)

Storage battery plates, including tubular retainers containing pencils of active material or material to become active, are possessed of many advantages but their weakness lies in the tubular retainers. These have been made of perforated hard rubber and of asbestos, cloth or paper. Neither rubber nor asbestos are really inert when subject to the conditions existing in a storage battery so that the life of tubular retainers made of those substances or materials is short in respect to the other parts of the battery plate, and they tend to soften and lose bursting strength, so that the active material contained in them bulges and pulls away from the conducting spine around which it is applied and by which it is supported thus impairing the continuity of the electrical path and promoting the deposition of sediment; moreover, tubes consisting of these materials are not easily attached or secured to the top and bottom bars of the plate which bars in their application involve the use of considerable heat which may deleteriously affect rubber and asbestos which in this use usually contains considerable cotton or like fibre.

The principal object of the present invention is to overcome these defects and disadvantages and to improve storage battery plates of the type to which reference has been made.

Other objects of the invention will appear from the following description at the end of which the invention will be claimed.

Generally stated the invention comprises tubes consisting of glass wool fabric (meaning a woven or knitted material) which are inert to conditions existing in a battery and to the heat to which they may be exposed during the manufacture of the plates.

Furthermore, by weaving the tube with a weft disposed in a continuous spiral of short pitch the warps are in position to resist end tension and the weft is disposed in proper position to resist bursting strain.

The invention also comprises the improvements to be presently described and finally claimed.

In the following description reference will be made to the accompanying drawing forming part hereof and in which.

Figure 1:
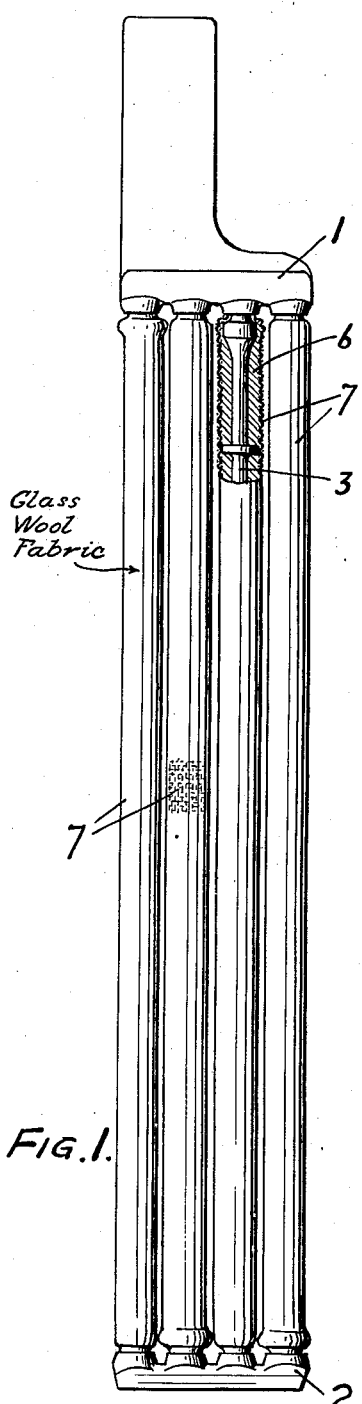
Figure 1 is an elevational view illustrative of a storage battery plate embodying features of the invention.
Figure 2:
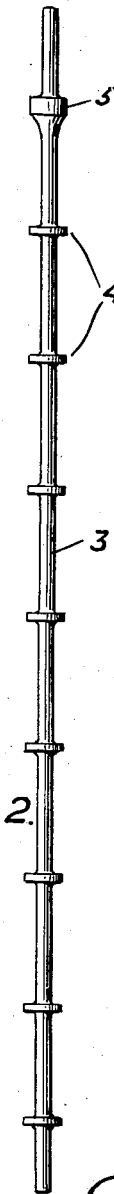
Fig. 2 is a detached elevational view of one of the spines.

Referring to the drawing, 1 indicates the top bar and 2 indicates the bottom bar between which the spines 3 extend and with which they are in electrical contact. The spines are shown as provided with buttons 4 and enlargements 5. The active material, or material to become active, is in the form of pencils 6 surrounding the body portion of the spines 3. The ends of the spines 3 are puddled and fused to the bars 1 and 2. In general there is nothing particularly new about the construction above described and it is usual to apply the pencil of active material 6 to a spine before the latter is connected to the top or bottom bar 1 or 2. A tubular envelope or retainer is also supplied over or around the active material and the ends of the retainer should extend close up to the top and bottom bars 1 and 2 in order that the tubular retainers may completely cover and enclose and confine the active material or material to become active.

According to the present invention, the tubes, envelopes or retainers 7 are composed of glass wool fabric, i. e., a woven or knitted material made from threads.

Figure 3:
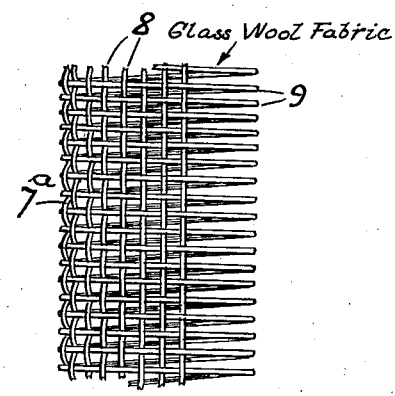
Fig. 3 is a diagrammatic or schematic view drawn to an enlarged scale and illustrating one way of constructing the glass wool tubes.

When the glass wool is woven as shown at 7a in Fig. 3 in such a way that the warps 8 extend lengthwise between the bars 1 and 2, and when the weft 9 is disposed in the path or flight of a spiral of short pitch, the weft tends to resist radial growth or bulging of the pencils.

The ends of the tubes which enclose the active material or material to become active may be secured by permitting the alloy of the bars when melted to run over their ends as indicated by the sectional showing in Fig. 1 without injuring the glass wool threads. The fact that the tubes are made of glass is important because that material is absolutely inert under all the conditions to which it is exposed in a storage battery and in the manufacture thereof.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. For storage battery plates comprising pencils of active material or material to become active mounted on metallic spines joined at their ends to top and bottom bars, glass wool fabric tubes constituting self-sustaining structures and having continuous uninterrupted walls enclosing the pencils and inert in respect to battery action and retaining their initial strength and form under all conditions arising in a storage battery, thereby promoting the durability and efficiency of the battery.

2. For storage battery plates comprising pencils of active material or material to become active mounted on metallic spines joined at their ends to top and bottom bars, woven glass wool tubes having uninterrupted walls enclosing the pencils and having the warp disposed lengthwise of the pencils and extending from the top to the bottom bars and having a weft encircling the pencils and disposed in a continuous spiral of short pitch.

3. For storage battery plates comprising pencils of active material or material to become active mounted on metallic spines joined at their ends to top and bottom bars, woven glass wool tubes having continuous and uninterrupted walls enclosing the pencils and having the warp disposed lengthwise of the pencils and extending from the top to the bottom bars and having the weft encircling the pencils and disposed in a spiral of short pitch, said lengthwise disposed warps attached to the top and bottom bars.

4. For storage battery plates comprising pencils of active material or material to become active, spines on which the pencils are mounted, bars to which the ends of the spines are connected by heat fusion, and self-sustaining glass wool fabric tubes having continuous and uninterrupted walls enclosing the pencils and imbedded in the products of the fusion and inert in respect to the degree of heat required in said fusion.

5. A positive electrode for storage batteries comprising a multiplicity of horizontally spaced, parallel and vertically extending rods each having a series of thin and relatively widely spaced spacing members projecting therefrom, a porous glass sheathing enclosing each of said rods and the spacing members thereon, active material filling the spaces between the members and enclosed in said sheathing around each of said rods, said sheathing having interwoven glass filaments forming a self-sustaining, highly porous and unobstructed outer covering for the active material, and top and bottom bars connecting said rods together in a group.

CLARENCE A. HALL.